United States Patent [19]
Lasis et al.

[11] 3,904,580
[45] Sept. 9, 1975

[54] AMINE MODIFIED REMOLDABLE RUBBERS

[75] Inventors: Evalds Lasis; Ernest Jack Buckler; John Robert Dunn, all of Sarnia, Ontario, Canada

[73] Assignee: Polysar Limited, Sarnia, Canada

[22] Filed: Sept. 26, 1974

[21] Appl. No.: 509,642

[30] Foreign Application Priority Data
Nov. 8, 1973  Canada .................................. 185313

[52] U.S. Cl...... 260/42.47; 260/33.8 UA; 260/80.7; 260/80.73; 260/83.5
[51] Int. Cl..... C08c 11/18; C08c 11/24; C08d 3/02
[58] Field of Search........... 260/80.7, 80.73, 80.3 N, 260/33.8 UA, 42.47, 42.52, 83.5

[56] References Cited
UNITED STATES PATENTS

| | | | |
|---|---|---|---|
| 2,840,550 | 6/1958 | Price et al...................... | 260/80.73 |
| 2,910,445 | 10/1959 | Mock et al...................... | 260/83.5 |
| 3,395,197 | 7/1968 | D'Alelio........................... | 260/83.5 |
| 3,440,232 | 4/1969 | Cramm et al..................... | 260/80.7 |
| 3,686,156 | 8/1972 | Hagman........................... | 260/83.5 |
| 3,732,190 | 5/1973 | Balle et al....................... | 260/80.73 |

*Primary Examiner*—Donald E. Czaja
*Assistant Examiner*—H. H. Fletcher
*Attorney, Agent, or Firm*—Stevens, Davis, Miller & Mosher

[57] ABSTRACT

Synthetic rubber compositions having both rubbery and thermoplastic properties are prepared by reacting a rubber copolymer of a conjugated diolefin, a vinyl monomer such as styrene or acrylonitrile and a tertiary amine group containing copolymerizable monomer such as dimethylaminoethyl methacrylate with an activated halogen compound such as $\alpha,\alpha'$-dichloro-p-xylene.

11 Claims, No Drawings

AMINE MODIFIED REMOLDABLE RUBBERS

This invention relates to synthetic rubbers, and more particularly to synthetic rubbers having both rubbery and thermoplastic characteristics.

Conventional rubbers, both natural and synthetic, suffer from the disadvantage that in order to develop their desirable elastomeric properties to the full, they need to be cross-linked, i.e., by curing or vulcanization, as a result of which the rubber compounds lose their thermoplastic nature. Thus in making goods from rubber, an uncured (green) rubber compound, containing the necessary curing reagents, is formed into the desired shape, e.g., by molding or extruding, and then heated to cure it. A cured elastomeric article is thus formed. However, the cured elastomer, as a result of the curing, is not remoldable. Scraps of cured rubber compound which are inevitably formed in manufacturing operations are of little value because they are not remoldable. They find some applications as fillers when mixed in small proportions with other compounding ingredients but they cannot be freely mixed with uncured rubber compounds and remolded, as with thermoplastics materials. The same also applies to rubber goods which are badly formed on molding, and rubber goods which have served a period of use. Since they are not thermoplastic nor remoldable, the rubber from which they are made essentially cannot be reused.

Among the commonest synthetic rubbers are rubbery butadiene-styrene copolymers (SBR) and rubbery butadiene-acrylonitrile copolymers (NBR). SBR is the general, all purpose synthetic rubber which finds very large volume applications in tires. NBR is an oil resistant synthetic rubber, generally used in more specialized applications such as rubber gaskets, hoses and the like.

The present invention provides a thermoplastic synthetic rubbery composition based upon a copolymer comprising a major proportion of a $C_4$–$C_6$ conjugated diolefin and a minor proportion of a vinyl or vinylidene substituted aromatic hydrocarbon or an unsaturated nitrile copolymerizable therewith, such as SBR or NBR, which can be used in applications requiring elastomeric properties, without the rubbers being cross-linked by the conventional processes so that the rubbers are remoldable and reprocessable.

The synthetic rubber compositions of the present invention comprise the reaction product of (a) a rubber copolymer of a $C_4$–$C_6$ conjugated diolefin and an acrylate or methacrylate of general formula

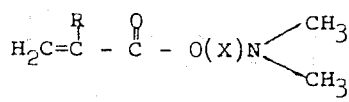

where R represents H or $CH_3$, and X represents an aliphatic hydrocarbon group of 2–4 carbon atoms or a secondary or tertiary amine substituted aliphatic hydrocarbon group of 2–4 carbon atoms, the copolymer containing from about 2 to about 5 wt. % of polymerized acrylate or methacrylate; and (b) a halogen containing organo compound containing 2 or more halogen atoms capable of reacting with the tertiary amine groups of the polymerized acrylate or methacrylate, the amount of halogen compound being such as to provide at least 0.25 moles of halogen groups per mole of tertiary amine groups in the copolymer.

Preferably, the rubbery copolymer is an SBR type, or an NBR type, and contains from about 49 to about 95 wt.% polymerized diolefin, and from about 49 to about 3 wt.% of a monomer selected from vinyl or vinylidene substituted aromatic hydrocarbons and unsaturated nitriles.

The rubbery copolymers used in the present invention are generally similar to conventional copolymers used as synthetic rubbers, except for the presence therein of the small amount of acrylate or methacrylate as hereinbefore defined. Examples of suitable conjugated diolefinic hydrocarbons are butadiene-1, 3, isoprene, piperylene and 2,3-dimethylbutadiene-1,3. Examples of suitable vinyl or vinylidene substituted aromatic hydro-carbons are styrene, alphamethylstyrene, and the vinyl toluenes. Examples of suitable unsaturated nitriles are acrylonitrile and methacrylonitrile. The preferred copolymers for use in the present invention are rubbery copolymers of butadiene and styrene (SBR) and rubbery copolymers of butadiene and acrylonitrile (NBR), and so further detailed description of the invention will have specific reference to these copolymers.

The rubbery copolymers of butadiene and styrene used in the present invention preferably have bound butadiene contents of from 60–85 wt.%, most preferably 70–82 wt.%, and bound styrene contents of from 40–15 wt.%, most preferably 30–18 wt.%, these percentages being based upon the total of bound butadiene and styrene in the copolymer.

The rubbery copolymers of butadiene and acrylonitrile used in the present invention preferably have bound butadiene contents of from about 49–80 wt.% polymerized butadiene, most preferably from 50–75 wt.% polymerized butadiene, and a bound acrylonitrile content of from about 20–51 wt.%, most preferably from 25–50 wt.%, polymerized acrylonitrile, these percentages being based upon the total of bound butadiene and acrylonitrile in the copolymer. Such copolymers are in accordance with NBR rubbers generally produced for oil resistant rubber applications.

The rubbery copolymers used in the compositions of the present invention also contain a small amount of a copolymerized acrylate or methacrylate of general formula

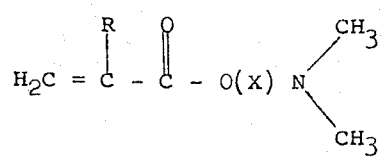

where R represents H or $CH_3$, X represents an aliphatic hydrocarbon group of 2–4 carbon atoms or a secondary or tertiary amine substituted aliphatic hydrocarbon group of 2–4 carbon atoms. Preferred among such monomers is dimethylaminoethyl methacrylate. This monomer, which is known per se, has the formula.

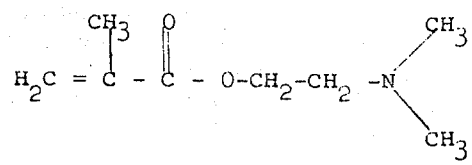

The acrylate or methacrylate is copolymerized with the other monomers in amounts to provide from about 2 to about 5, preferably from 3 to 4, wt.% copolymerized acrylate or methacrylate in the resulting rubbery copolymer. This provides in the copolymer tertiary amine groups chemically attached to the polymer chain. As will be more fully described hereinafter, these tertiary amine groups, it is believed, are used in the formation of bonds between polymer chains, by reaction with suitable organic halogen compounds. In the amounts in which it is used in the copolymers for the present invention, however, the acrylate or methacrylate does not significantly detract from the rubbery properties of the copolymers.

The rubbery copolymers used in the present invention are suitably prepared by copolymerization of the monomers, in the desired proportions, in a conventional emulsion polymerization system. This normally involves aqueous emulsion polymerization, at a pH of 7–11 using a free radical initiator system. Dimethylaminoethyl methacrylate has a substantially similar polymerization reactivity in such systems to the other monomers used, so that a reasonable distribution of tertiary amine groups derived therefrom along and among the polymer molecules can be obtained by adding this amine monomer, together with the other polymerizable monomers, before the polymerization is started. It is, however, preferred to add the amine monomer incrementally during the polymerization, whereby the amine groups tend to be more randomly distributed along and between the polymer molecules.

After polymerization, the copolymer is reacted with a halogen containing organo compound, to form the rubbery compositions of the present invention. Suitable halogen containing organo compounds are those containing two or more halogen atoms capable of reacting with the tertiary amine groups of the copolymer. The halogen compounds are preferably activated dihalo compounds wherein the halogen groups are activated by an adjacent grouping such as a carbon-carbon double bond, an aromatic nucleus or an electron donor group, such as a carbonyl or carboxylic acid group, the halogen being selected from chlorine, bromine, and iodine. Examples of suitable organic halogen compounds are $\alpha,\alpha'$-dichloro-xylenes; 1,4-dibromobutene-2; $\alpha,\alpha'$-dibromoxylenes; liquid dibromopolybutadiene having bound allylic bromide groups; dibromosorbic acid $CH_3$—CHBr—CH=CH—CHBr—COOH, which is prepared by direct bromination of sorbic acid, alkali metal salts of dibromosorbic acid, other halogenated polymers including partially brominated polyisoprene, and mixtures thereof. Preferred are $\alpha,\alpha'$-dichloro-p-xylene and the liquid dibromo polybutadiene having a molecular weight in the range 200–5,000, with $\alpha,\alpha'$-dichloro -and $\alpha,\alpha'$-dibromo-m- and p-xylenes being the most preferred.

The theoretical basis of the present invention has been tentatively established only, and it is not intended that the invention should be interpreted as limited to any particular theory of operation. It appears, however, that the amine groups incorporated into the polymer by copolymerization with the dimethylaminoethyl methacrylate react with the halogen groups on the halogen organic compound, to form labile crosslinks between the polymer chains. Such crosslinks are stable up to an elevated temperature of the order of 125°C, but above such temperatures seem to disappear. Thus, up to about 125°C, the rubber compounds of the invention have the elastomeric properties normally associated with cured, crosslinked SBR or NBR rubber compounds. The crosslinks appear to be stable in the absence of a shearing action, but in the presence of a shear, such as from a rubber mill and, preferably, some heat, the crosslinks seem to disappear and the material may be re-processed. Thus the rubber compounds of the invention may be re-processed by the action of shear and some heat, and may be re-shaped or re-molded, preferably at temperatures above about 100°C, and after cooling and resting the remolded material still possesses elastomeric properties, the crosslinks having reformed.

In accordance with this theoretical explanation, the halogen compound which is chosen for reaction with the rubbery copolymer must be able to react with, or at least chemically associated with, two or more polymer chains, in such a manner that the chemical bonds formed are reversible, and can be broken by shear and heat and re-formed on cooling. The organic halogen compounds listed above are examples of suitable such organic halogen compounds. Also in accordance with this theoretical explanation, the amounts of organic halogen compound which is used should be chosen carefully to give the desired reactions to the desired extent. On grounds of efficient utilization of amine groups in the polymer and on grounds of economy in the use of organic halogen compound, the amount of organic halogen compound selected with the rubbery copolymer should be such as to provide fairly close to a chemical equivalence of halogen groups and amine groups in the rubbery polymer. Thus, the amounts of the halogen compound are such that it contains at least 0.25 moles of halogen groups per mole of tertiary amine group in the rubbery copolymer, the preferred amount of the halogen compound is that which contains from 0.5 to 5 moles of halogen groups per mole of tertiary amine group in the rubbery copolymer and the most preferred amount of halogen compound is that which contains from 1 to 3 moles of halogen groups per mole of tertiary amine group in the rubbery copolymer.

The reaction of the rubbery copolymer and the halogen compound can be effected in several ways. Whilst reaction can take place at the latex stage, by adding the halogen compound to the latex after polymerization, best results are obtained when the copolymer is recovered from the latex in the conventional way, and then reacted subsequently with the halogen compound. The halogen compound may be added at any suitable stage following recovery from the latex, including during the drying of the rubber or during a milling operation in the process of preparing the rubber for packaging. Alternatively, the halogen compound may be added to the polymer along with other compounding ingredients, e.g., on a rubber mill or in an internal mixer. The halogen compound can advantageously be added to the rubbery copolymer after mixing the rubbery copolymer with the desired amount of fillers, for example carbon black.

The compositions of the present invention will normally contain additional ingredients, besides the reaction product of the rubbery copolymer and the halogen compound, in order fully to develop their desirable properties as synthetic rubbers. For example, they may be compounded with fillers such as carbon black, (in amounts of 20–120 phr) silica and the like, and with extenders such as the hydrocarbon mineral oils for the SBR and the ester-type plasticizers for the NBR. However, it will be appreciated that, in order to retain their thermoplastic nature, compositions of the present invention do not contain other materials designed to cure or crosslink them, such as sulphur, accelerators and the like, as are normally used with conventional synthetic rubbers. All of the "curing" necessary for the compounds to develop their full rubbery properties is provided by the labile crosslinks formed by reaction of the amine groups on the polymer with the organic halogen compound. Optionally, though, the compositions of the invention may also be crosslinked in the conventional manner so as to obtain a mixture of permanent and labile crosslinks but such crosslinked compositions will no longer be remoldable.

Since the rubbery properties such as room temperature strength and elongation are conferred at least in part on the compositions of the present invention by the crosslinks formed between the amine groups on the polymer and the organic halogen compound reacted therewith, it is important that the number of such crosslinks be controlled. If too few such labile crosslinks are formed, the strength of the rubber composition at room temperature will be inadequate for its use, in the absence of some additional crosslinking or curing step, as in the case of normal synthetic rubbers. If too many crosslinks are formed in the composition, the labile nature of such crosslinks appears to be lost, so that they do not disappear under the influence of shear and heat. In such case, the remoldable nature of the rubber compositions is lost. They behave in the same manner as normally cured rubbers, and are not remoldable. In essence, under such circumstances, the reaction between the organic halogen compound and the amine in the polymer has taken the place of the normal sulphur vulcanization.

In order to ensure both the rubbery and thermoplastic remoldable nature of the compositions of the present invention, therefore, it is necessary to control the amount of dimethylaminoethyl acrylate in the rubbery copolymer to about 2 to about 5 wt.%, preferably from about 3 to about 4 wt.%, and to control the amount of organic halogen compound reacted with the rubbery copolymer to provide at least 0.25 moles of halogen groups per mole of tertiary amine group in the polymer, preferably from about 0.5 to 5 moles of halogen group per mole of tertiary amine group in the polymer.

The preferred amounts of amine group in the polymer and organic halogen compound correspondingly used therewith is also affected to some extent by the Mooney of the rubbery copolymer under consideration. In respect to SBR polymers, thermo-plastic rubbery compositions in accordance with the present invention can be obtained using rubbery copolymers of Mooney ML4 of from about 10 to about 80. However, with polymers at the higher end of this range, i.e., above about Mooney ML-4 of 40, it is necessary to form smaller numbers of labile crosslinks, by using smaller amounts of dimethylaminoethyl methacrylate monomer. The preferred SBR type polymers for use in making compositions of the present invention are those having Mooney ML-4 of from about 20 to about 40, and containing the aforementioned preferred range of copolymerized dimethylaminoethyl methacrylate reacted with the aforementioned preferred amounts of organic halogen compound. In the case of NBR type polymers, the preferred Mooney range of the rubbery polymer for making compositions of the present invention is ML-4 of 5–50, preferably a Mooney of 10–25, along with the aforementioned amounts of dimethylaminoethyl methacrylate and organic halogen compound.

In many instances, it is found that the reaction between the amine groups on the rubbery copolymer and the organic halogen compound is slow. Thus, the compositions of the present invention do not develop their full strength and rubbery properties immediately after mixing the copolymer with the organic halogen compound, but must be left to stand for a period, sometimes of the order of several days, in order to develop their desirable properties. It is preferred to heat the copolymer and the halogen compound in order to accelerate the rate of the reaction between the amine groups of the copolymer and the organic halogen compound. Suitable conditions are temperatures of 50°–200°C, preferably 100°–175°C, for times of 1 minute to 6 hours, preferably 5 minutes to 1 hour.

The compositions of this invention may be moulded or shaped and crosslinked in one step or they may be crosslinked and then molded or shaped in two steps. When shaped and crosslinked, the compositions, after cooling to about room temperature, attain reasonable strength properties, the compositions ranging from fairly soft elastic materials to very high strength rubbers. When remolded or reshaped, the compositions retain reasonable strength properties such as still to be of commercial use. Such remolded or reshaped compositions are found to have substantially smooth surfaces thereby indicating the thermoplastic nature of the composition.

The invention will be further described with reference to the following specific examples. All physical property testing was done at room temperature except where specified otherwise.

EXAMPLE 1

A series of butadiene-styrene-dimethylaminoethyl methacrylate terpolymers was prepared, compounded with antioxidant and carbon black, and reacted with $\alpha,\alpha'$-dichloro-p-xylene, in accordance with the present invention, and the physical properties and thermoplastic nature of the resulting products were tested.

Each of the samples was prepared by emulsion copolymerization using a standard "cold" emulsion polymerization recipe commonly used in preparing SBR rubber. The rubbery copolymers were recovered from the polymerization latex and dried, in the normal way, and one phr of Naugawhite*, (alkylated bis phenol. This information is taken from "Materials and Compounding Ingredients for Rubber" (1968 ed.). anti-oxidant was incorporated into each sample. The polymers were subjected to infra-red analysis, to determine the amounts of comonomers contained therein. The raw polymer Mooney ML-4 of each sample was measured in the conventional way.
*Trademarks Portions of each sample were compounded on a mill with 50 phr carbon black (VULCAN 6)*. After the carbon black had been thoroughly mixed into the rubber compound on the mill, 1.5 phr $\alpha,\alpha'$-dichloro-p-xylene was added to each sample. The $\alpha,\alpha'$-dichloro-p-xylene was added to the compound on the mill, by wrapping the compound around it envelope style and then giving the compound about 30 passes through the mill, folding it up in between each pass. Then the samples were sheeted off the mill, put into a mold and crosslinked by heating for 5 minutes at 175°C, rested for one day to allow them to cool, and then their stress-strain properties were measured, using microdumbbells cut from the sheets, in the conventional way. After the samples had rested for 8 days, the stress-strain properties were measured again, in the same manner.

A further portion of each crosslinked sample was subjected to a hot milling procedure, at about 175°C on a rubber mill. It was found that continuous bands were formed on the mill, indicating the thermoplastic nature of the compounds after reaction with the organic halogen compound. The compounds were sheeted off and cooled. Aa further portion of each sample was again heated to about 175°C and pressed into a sheet in a mold to obtain a hot remilled sample, where was subsequently tested for physical properties. A hot remilled sample was thus obtained from each composition, after one day of aging and after 8 days of aging. All the samples remilled smoothly at 175°C and remolded to smooth sheets in 5 minutes at 175°C.

The details of the compound and the results of the tests are given in Table I.

The polymers were prepared by a copolymerization of the respective monomers, in the desired proportions, in an aqueous emulsion polymerization recipe, in accordance with normal procedures for making NBR polymers. When the copolymerization had proceeded to the desired extent, the polymers were recovered from the polymerization latex by coagulation, and dried. 1 phr Naugawhite (trade mark) antioxidant was added to each polymer.

The polymers were compounded on a small rubber mill with carbon black. After the carbon black had been fully incorporated into the polymer, the respective organic halogen compound was added, to the polymer compound on the mill. Since the polymers were of comparatively low Mooney, they were sticky in nature, and it was found necessary to use a chilled mill. Then the samples were removed from the mill, and molded for 5 minutes at 175°C between Teflon sheets. Initial stress-strain properties of these samples were then measured, in the normal way. Samples of each composition were then remilled on a mill at 175°C, and were found

TABLE 1

| Compound Reference | | 85-EM-473 | 85-EM-474 | 85-EM-475 | 85-EM-476 |
|---|---|---|---|---|---|
| Weight % butadiene | | 73.7 | 73.7 | 73.4 | 73.4 |
| Weight % styrene | | 23 | 23 | 23 | 23 |
| Weight % dimethyl-aminoethyl methacrylate | | 3.3 | 3.3 (incremental addition) | 3.6 (incremental addition) | 3.6 (incremental addition). |
| Raw Polymer Mooney, ML4 | | 28.5 | 27.0 | 26.5 | 27.0 |
| Parts by weight polymer | | 200 | 200 | 200 | 200 |
| Parts by weight carbon black | | 100 | 100 | 100 | 100 |
| Parts by weight dichloro-p-xylene | | 3 | 3 | 3 | 3 |
| Stress-strain after 1 day. | | | | | |
| Tensile | Original | 24 | 32 | 31 | 25 |
| (Kg/cm$^2$) | Remilled | 38 | 46 | 49 | 46 |
| Elongation | Original | 250 | 210 | 220 | 250 |
| (%) | Remilled | 380 | 260 | 270 | 290 |
| Stress-strain after 8 days. | | | | | |
| Tensile | Original | 51 | 56 | 69 | 64 |
| (Kg/cm$^2$) | Remilled | 42 | 54 | 63 | 62 |
| Elongation | Original | 220 | 200 | 250 | 250 |
| (%) | Remilled | 400 | 280 | 280 | 310 |
| 100% Modulus | Original | 25 | 31 | 27 | 24 |
| (Kg/cm$^2$) | Remilled | 14 | 40 | 20 | 20 |

It will be noted that the physical properties of the compositions were improved for the samples which had been rested for 8 days. This indicates that the reaction of the rubber and halogen compound is slow, taking a considerable time to reach completion.

EXAMPLE 2

In this example, a series of terpolymers of butadiene, acrylonitrile and dimethylaminoethyl methacrylate were prepared, of different Mooneys and containing different amounts of dimethylaminoethyl methacrylate, and reacted with different organic halogen compounds to provide compositions of the present invention.

to give smooth rolling banks. This indicated the thermoplastic nature of the compositions. The remilled samples were remolded for five minutes at 175°C, and tested for stress-strain properties at room temperature. The results are given in Table 2. Samples of these compositions were used to determine the physical properties at various temperatures. These samples had been rested for 14 days before being tested. The test temperatures were as shown in Table 2. It will be noted that the samples retained reasonable strength properties up to fairly high temperatures.

TABLE 2

| Compound reference | 85-EM -288 | 85-EM -289 | 85-EM -290 | 85-EM -291 | EM-721 226-1 | EM-721 226-2R | EM-721 226-3R |
|---|---|---|---|---|---|---|---|
| Wt. % butadiene | 63.4 | 63.5 | 63.5 | 63.7 | 63 | 63 | 63 |
| Wt. % acrylonitrile | 33.0 | 33.0 | 33.0 | 33.1 | 33 | 33 | 33 |
| Wt. % dimethylaminoethyl methacrylate | 3.6 | 3.5 | 3.5 | 3.2 | 4 | 4 | 4 |
| Raw Polymer Mooney, ML4 | 10.0 | 12.5 | 12.5 | 9.0 | 18 | 21 | 42.5 |
| Parts by weight polymer | 200 | 200 | 200 | 200 | 200 | 200 | 200 |
| Parts by weight carbon black | 100 | 100 | 100 | 100 | 100 | 100 | 100 |
| Parts by weight $\alpha,\alpha'$-dichloro-p-xylene | — | — | 3 | — | 3 | — | 3 |

TABLE 2-continued

| Compound reference | | 85-EM-288 | 85-EM-289 | 85-EM-290 | 85-EM-291 | EM-721 226-1 | EM-721 226-2R | EM-721 226-3R |
|---|---|---|---|---|---|---|---|---|
| Parts by weight liquid dibromopolybutadiene | | 34.2 | 34.2 | — | 34.2 | — | 34.2 | — |
| Stress-strain, room temperature | | | | | | | | |
| Tensile (Kg/cm²) | Original | 41 | 18 | 34 | 27 | 174 | 35 | 105 |
| | Hot remill | 30 | 17 | 44 | 23 | | 30 | 77 |
| Elongation (%) | Original | 630 | 610 | 430 | 440 | 310 | 800 | 440 |
| | Hot remill | 590 | 520 | 610 | 530 | | 560 | 370 |
| 100% modulus (Kg/cm²) | Original | 9 | 9 | 15 | 11 | 46 | 11 | 20 |
| | Hot remill | 9 | 10 | 15 | 10 | | — | — |
| 300% modulus (Kg/cm²) | Original | 24 | 16 | 30 | 26 | 164 | 23 | 71 |
| | Hot remill | 22 | 15 | 32 | 21 | | 19 | 62 |
| Shore A Hardness | Original | 53 | 53 | 61 | 54 | 65 | | |
| | Hot remill | 48 | 49 | 56 | 52 | | | |
| Stress-strain V Temperature | | | | | | | | |
| Tensile at room Temp. | (Kg/cm²) | 43 | 22 | 157 | 35 | | | |
| at 50°C | " | 26 | 12 | 96 | 29 | | | |
| at 75°C | " | 19 | 7 | 70 | 17 | | | |
| at 100°C | " | 12 | — | 52 | 12 | | | |
| at 125°C | " | — | — | 50 | — | | | |
| Elongation at room temp. | % | 540 | 500 | 400 | 430 | | | |
| at 50°C | " | 360 | 300 | 340 | 310 | | | |
| at 75°C | " | 330 | 200 | 300 | 230 | | | |
| at 100°C | " | 250 | — | 230 | 140 | | | |
| 100% modulus at room temp. | (Kg/cm²) | 8 | 10 | 30 | 16 | | | |
| at 50°C | " | 8 | 6 | 20 | 9 | | | |
| at 75°C | " | 5 | 4 | 16 | 8 | | | |
| at 100°C | " | 4 | — | 16 | 8 | | | |
| 300% modulus at room temp. | (Kg/cm²) | 28 | 19 | 120 | 35 | | | |
| at 50°C | " | 22 | 12 | 86 | 23 | | | |
| at 75°C | " | 17 | — | 70 | — | | | |

The polymer compositions and strength properties are shown in Table 3.

TABLE 3

| Sample Code | EM — | | 730708-1 | 730707-5 | 730708-2 | 730708-3 |
|---|---|---|---|---|---|---|
| Polymer Composition | | | | | | |
| Butadiene | Wt% | | 91.5 | 48.25 | 65 | 48 |
| Styrene | Wt% | | 5 | 48.25 | — | — |
| Acrylonitrile | Wt% | | — | — | 32 | 48 |
| Dimethylaminoethyl methacrylate | Wt% | | 3.5 | 3.5 | 3 | 4 |
| Mooney (ML1+4 at 100°C) | | ea. | 35 | 11.5 | 11 | 12 |
| Compounding | | | | | | |
| Polymer (parts by weight) | | | 100 | 100 | 100 | 100 |
| Vulcan 6 black (parts by weight) | | | 50 | 50 | 50 | 50 |
| Antioxidant 2246 (parts by weight) | | | 1 | 1 | 1 | 1 |
| α,α'-dichloro-p-xylene (parts by weight) | | | 2.5 | 2.5 | 2.5 | 2.5 |
| Crosslinked Composition Properties | | | | | | |
| Tensile Strength (Kg/cm²) original | | | 130 | 82 | 104 | 141 |
| re-milled | | | 42 | 52 | 143 | 172 |
| Elongation (%) original | | | 210 | 200 | 380 | 470 |
| re-milled | | | 160 | 260 | 240 | 320 |
| 100% Modulus (Kg/cm²) original | | | 64 | 56 | 34 | 77 |
| re-milled | | | 34 | 20 | 66 | 88 |
| 300% Modulus (Kg/cm²) original | | | — | — | 90 | 132 |
| re-milled | | | — | — | — | 169 |

EXAMPLE 3

Two copolymers of butadiene and styrene and two copolymers of butadiene and acrylonitrile, all contained copolymerized dimethylaminoethyl methacrylate, were crosslinked by reaction with α,α'-dichloro-p-xylene. The compounding procedure was as per Example 1, and the molded Samples were crosslinked by heating for 5 minutes at 175°C. The re-milled Samples were crosslinked samples which had been hot mill treated at 175°C to form essentially continuous bands on the mill rolls which, on removal from the mill, were remolded by heating for 5 minutes at 175°C.

EXAMPLE 4

A copolymer of butadiene, acrylonitrile and dimethylaminoethyl methacrylate, containing respectively 48 weight %, 48 weight % and 4 weight % of the components, was mixed (100 parts by weight) with 50 parts by weight of Vulcan 6 carbon black, 1 part by weight of antioxidant 2246 and 2.5 parts by weight of α,α'-dichloro-p-xylene using the procedure of Example 1. These compositions were crosslinked for various times at various temperatures and the strength properties were determined with the results shown in Table 4.

It is apparent from Table 4 that this copolymer is fairly rapidly crosslinked by reaction with the dichloroxylene and the crosslinked compositions have high strength properties.

The crosslinked composition of Table 4 were found to be readily remoldable and had high strength properties after remolding. Sample 4C was remilled on a mill, the rolls of which were at room temperature, and was found to form a good rolling bank. The re-milled sample was re-molded by heating for 5 minutes at 100°C and, after cooling, was found to have a tensile strength of 140Kg/cm².

TABLE 4

| Compound Reference | | 4A | 4B | 4C | 4D | 4E | 4F | 4G |
|---|---|---|---|---|---|---|---|---|
| | | Crosslinking time at 75°C | | | Crosslinking time at 100°C | | | |
| | | 30 mins | 60 mins | 120 mins | 5 mins | 15 mins | 30 mins | 60 mins |
| Tensile Strength | (Kg/cm²) | 196 | 190 | 186 | 192 | 188 | 188 | 176 |
| Elongation | (%) | 450 | 500 | 600 | 460 | 520 | 510 | 590 |
| 100% Modulus | (Kg/cm²) | 70 | 50 | 50 | 50 | 50 | 60 | 50 |
| 300% Modulus | (Kg/cm²) | 150 | 124 | 118 | 140 | 128 | 134 | 116 |

EXAMPLE 5

A styrene-butadiene-dimethylaminoethyl methacrylate copolymer containing 23 weight per cent of styrene and 2.2 weight per cent of the methacrylate and haivng a Mooney (ML-1+4 at 100°C) of 31 was used to prepare cross-linked compositions by reaction with various levels $\alpha,\alpha'$-dichloro-p-xylene. The polymer, filler and dichloro-p-xylene were mixed as in previous examples and were crosslinked by heating for 5 minutes at 175°C. Samples of the crosslinked compositions were remilled at 175°C forming good rolling banks and were then sheeted off and re-molded by heating in a mold for 5 minutes at 175°C. The stress-strain properties were measured on the crosslinked compositions and are recorded in Table 5 along with the recipes used to prepare the compositions. A crosslinked composition containing $\alpha, \alpha'$-dibromo-m-xylene was also similarly prepared and tested.

The results in Table 5 show that the properties of the crosslinked compositions are influenced by the ratio of the crosslinking agent to the amine content of the polymer.

$C_6$ conjugated diolefin and an acrylate or methacrylate of general formula

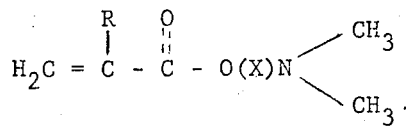

where R represents H or $CH_3$ and X represents an aliphatic hydrocarbon group of 2–4 carbon atoms or a secondary or tertiary amine substituted hydrocarbon group of 2–4 carbon atoms, the copolymer containing from about 2 to about 5 weight per cent of polymerized acrylate or methacrylate, and (B) a halogen containing organo compound containing 2 or more halogen atoms capable of reacting with the tertiary amine groups of the polymerized acrylate or methacrylate, the amount of halogen compound being such as to provide from about 0.25 moles to about 5 moles of halogen groups per mole of tertiary amine groups in the copolymers.

2. The composition of claim 1 wherein the halogen containing compound is an activated dihalo compound selected from the group consisting of $\alpha,\alpha'$-dichloro-xylenes, $\alpha,\alpha'$-dibromo-xylenes, 1,4-dibromobutene-2, liquid dibromopolybutadiene having bound allylic bromide groups and a molecular weight of 200 to 5,000, and mixtures thereof.

3. The composition of claim 2 wherein the amount of halogen compound is sufficient to provide from 0.5 to 5 moles of halogen groups per mole of tertiary amine groups in the copolymer.

4. The composition of claim 3 wherein the rubbery copolymer is a copolymer of butadiene, styrene and dimethylaminoethyl methacrylate having a bound butadi-

TABLE 5

| Experiment | | 5A | 5B | 5C | 5D | 5E | 5F | 5G |
|---|---|---|---|---|---|---|---|---|
| Polymer | (parts by wt.) | 100 | 100 | 100 | 100 | 100 | 100 | 100 |
| Vulcan 6 | (parts by wt.) | 50 | 50 | 50 | 50 | 50 | 50 | 50 |
| Antioxidant 2246 | (parts by wt.) | 1 | 1 | 1 | 1 | 1 | 1 | 1 |
| $\alpha,\alpha'$-dichloro-p-xylene | (parts by wt.) | 0.4 | 0.8 | 1.6 | 2.5 | 3.2 | 6.4 | — |
| $\alpha,\alpha'$-dibromo-m-xylene | (parts by wt.) | — | — | — | — | — | — | 3.8 |
| Cross-linked composition properties | | | | | | | | |
| Tensile strength (Kg/cm²) | -original | 20 | 34 | 90 | 182 | 148 | 132 | 106 |
| | -remilled | 12 | 26 | 38 | 42 | 60 | 34 | 102 |
| Elongation (%) | -original | 450 | 310 | 340 | 370 | 320 | 400 | 320 |
| | -remilled | 630 | 480 | 420 | 310 | 280 | 340 | 410 |
| 100% Modulus (Kg/cm²) | -original | 10 | 16 | 20 | 38 | 42 | 42 | 16 |
| | -remilled | 6 | 10 | 12 | 14 | 24 | 12 | 21 |
| 300% Modulus (Kg/cm²) | -original | 18 | 34 | 42 | 152 | 140 | 102 | 98 |
| | -remilled | 10 | 22 | 32 | 40 | — | 30 | 100 |

What is claimed is:

1. A composition of matter having rubbery and thermoplastic properties, said composition comprising the reaction product of (A) a rubbery copolymer of a $C_4$ – ene content of from 60 to 85 weight per cent and a bound styrene content of from 40 to 15 weight per cent based upon the total of bound styrene and butadiene in the copolymer.

5. The composition of claim 3 wherein the rubbery copolymer is a copolymer of butadiene, acrylonitrile and dimethylaminoethyl methacrylate having a bound butadiene content of from about 49 to 80 weight per cent and a bound acrylonitrile content of from about 51 to 20 weight per cent based upon the total of bound butadiene and acrylonitrile in the copolymer.

6. The composition of claim 1 which also contains from 20 to 120 parts by weight of carbon black per 100 parts by weight of rubbery copolymer.

7. A process for preparing thermoplastic rubbery compositions which comprises reacting a rubbery copolymer of a $C_4 - C_6$ conjugated diolefin and an acrylate or methacrylate of general formula

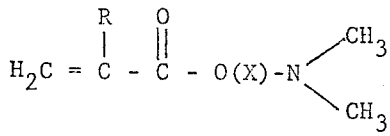

where R represents H or $CH_3$ and X represents an aliphatic hydrocarbon group of 2-4 carbon atoms or a secondary or tertiary amine substituted aliphatic hydrocarbon group of 2-4 carbon atoms, the copolymer containing from about 2 to about 5 weight per cent of polymerized acrylate or methacrylate, with a halogen containing organo compound containing 2 or more halogen atoms capable of reacting with the tertiary amine groups of the polymerized acrylate or methacrylate, the amount of halogen compound being such as to provide from about 0.25 moles to about 5 moles of halogen groups per mole of tertiary amine groups in the copolymer, said reaction being at a temperature of from 100 to 175°C for a time of from 5 to 60 minutes.

8. The process of claim 7 wherein the halogen containing compound is selected from the group consisting of $\alpha,\alpha'$-dichloro-xylenes, $\alpha,\alpha'$-dibromo-xylenes, 1,4-dibromobutene-2, liquid dibromopolybutadiene having bound allylic bromide groups and a molecular weight of 200 to 5,000, and mixtures thereof.

9. The process of claim 8 wherein the rubbery copolymer is selected from butadiene-styrene-dimethylaminoethyl methacrylate copolymers containing 60–85 weight per cent of butadiene or from butadiene-acrylonitrile-dimethylaminoethyl methacrylate copolymers containing 49–80 weight per cent of butadiene.

10. The process of claim 8 wherein the halogen compound is reacted with the rubbery copolymer by adding, after the polymerization is completed, the halogen compound to the polymerization latex of the rubbery copolymer.

11. The process of claim 8 wherein the rubbery copolymer is recovered from its polymerization latex and subsequently reacted with the halogen compound during one of drying of the rubbery copolymer, a milling operation in preparing the rubbery copolymer for packaging, or mixing of the rubbery copolymer with compounding ingredients.

* * * * *